United States Patent
Choi et al.

(10) Patent No.: US 10,504,428 B2
(45) Date of Patent: Dec. 10, 2019

(54) COLOR VARIANCE GAMMA CORRECTION

(71) Applicant: Microsoft Technology Licensing, LLC, Redmond, WA (US)

(72) Inventors: Minhyuk Choi, Mill Creek, WA (US); Samu Matias Kallio, Redmond, WA (US); Ying Zheng, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/786,210

(22) Filed: Oct. 17, 2017

(65) Prior Publication Data
US 2019/0114963 A1 Apr. 18, 2019

(51) Int. Cl.
*G09G 3/30* (2006.01)
*G09G 3/3233* (2016.01)
(Continued)

(52) U.S. Cl.
CPC ......... *G09G 3/3233* (2013.01); *G09G 3/2003* (2013.01); *G09G 3/2074* (2013.01);
(Continued)

(58) Field of Classification Search
CPC ............... G09G 3/3266; G09G 3/3291; G09G 2310/08; G09G 2310/0235;
(Continued)

(56) References Cited

U.S. PATENT DOCUMENTS 6,384,806 B1 5/2002 Matsueda et al.
6,388,648 B1 5/2002 Clifton et al.
(Continued)

FOREIGN PATENT DOCUMENTS

| EP | 1225557 A1 | 7/2002 |
| EP | 2881933 A1 | 6/2015 |
| KR | 20030017222 A | 3/2003 |

OTHER PUBLICATIONS

"DSVGA: 800 X 600 Low Power Monochrome Green XLT Amoled Microdisplay", Retrieved From <<https://www.google.co.in/url?sa=t&rct=j&q=&esrc=s&source=web&cd=4&cad=rja&uact=8&ved=0ahUKEwiP15iF-uLUAhUHuY8KHcSTDMwQFgg4MAM&url=http%3A%2F%2Fbiakom.com%2Fpdf%2FDSVGA-E-Magin.pdf&usg=AFQjCNH9zkID1ixbHcU57ACkAgs3VQqXxg>>, May 8, 2015, pp. 1-85.
(Continued)

*Primary Examiner* — Jennifer T Nguyen
(74) *Attorney, Agent, or Firm* — Holzer Patel Drennan

(57) ABSTRACT

While organic light-emitting diode (OLED) display devices are often calibrated upon commissioning to provide similar output colors in response to input signals, they are not calibrated based on varying display content. Significant variation in output color as a function of varying output display content is increasingly unacceptable to users. In an OLED display, an emissive electroluminescent layer selectively emits light in discrete areas in response to an electric current. Higher overall applied electrical currents correspond to higher overall output luminesces, however, as current is increased, attendant voltage generally drops. Variation in attendant voltage causes variation in output color. The presently disclosed display drivers that detect an on-pixel ratio of an input display signal, select a gamma correction factor, apply the selected gamma correction factor, and output a color-corrected display signal to the OLED display address variations in output color as a function of varying output display content.

20 Claims, 5 Drawing Sheets

(51) Int. Cl.
*G09G 3/20* (2006.01)
*H04N 9/73* (2006.01)
*G09G 3/3225* (2016.01)

(52) U.S. Cl.
CPC ............ *G09G 3/3225* (2013.01); *H04N 9/73* (2013.01); *G09G 2320/0223* (2013.01); *G09G 2320/0242* (2013.01); *G09G 2320/0271* (2013.01); *G09G 2320/0276* (2013.01); *G09G 2320/0666* (2013.01); *G09G 2320/0673* (2013.01); *G09G 2360/16* (2013.01)

(58) Field of Classification Search
CPC ... G09G 2320/0276; G09G 2320/0289; G09G 3/3225; G09G 5/003; G09G 2330/028; G09G 2360/16; H04N 9/73
USPC ........... 345/76, 690; 315/169.1–169.3
See application file for complete search history.

(56) References Cited

U.S. PATENT DOCUMENTS

| | | | |
|---|---|---|---|
| 6,750,839 | B1 | 6/2004 | Hogan |
| 6,795,063 | B2 | 9/2004 | Endo et al. |
| 6,950,045 | B2 | 9/2005 | Kim |
| 7,068,283 | B2 | 6/2006 | Huang |
| 7,443,540 | B2 | 10/2008 | Kasai et al. |
| 9,654,747 | B2 | 5/2017 | Asada |
| 2002/0130830 | A1 | 9/2002 | Park |
| 2002/0145584 | A1 | 10/2002 | Waterman |
| 2003/0142084 | A1 | 7/2003 | Chang et al. |
| 2004/0114396 | A1 | 6/2004 | Kobayashi et al. |
| 2005/0041007 | A1 | 2/2005 | Iijima |
| 2005/0140640 | A1 | 6/2005 | Oh et al. |
| 2005/0212736 | A1 | 9/2005 | Lu et al. |
| 2005/0219271 | A1 | 10/2005 | Tanaka |
| 2006/0077200 | A1 | 4/2006 | Tamayama |
| 2007/0126757 | A1 | 6/2007 | Itoh et al. |
| 2008/0001881 | A1 | 1/2008 | Baba et al. |
| 2009/0091528 | A1 | 4/2009 | Hong |
| 2009/0167782 | A1 | 7/2009 | Petljanski et al. |
| 2009/0243982 | A1 | 10/2009 | Lee et al. |
| 2010/0109992 | A1 | 5/2010 | Sumi et al. |
| 2010/0110065 | A1 | 5/2010 | Abe |
| 2010/0156777 | A1 | 6/2010 | Kang et al. |
| 2012/0069022 | A1 | 3/2012 | Majumder et al. |
| 2012/0105515 | A1 | 5/2012 | Iwasaki et al. |
| 2013/0021386 | A1 | 1/2013 | Min et al. |
| 2013/0127924 | A1 | 5/2013 | Lee |
| 2014/0125714 | A1 | 5/2014 | Pyo |
| 2015/0042696 | A1 | 2/2015 | Ooga |
| 2015/0091950 | A1* | 4/2015 | Park .................... G09G 3/3291 345/690 |
| 2015/0097764 | A1 | 4/2015 | Pyo et al. |
| 2015/0097872 | A1 | 4/2015 | Jeong et al. |
| 2015/0103105 | A1 | 4/2015 | Kim et al. |
| 2015/0154913 | A1 | 6/2015 | Kim |
| 2015/0161941 | A1 | 6/2015 | Lim et al. |
| 2015/0371594 | A1 | 12/2015 | Huang et al. |
| 2016/0117997 | A1 | 4/2016 | Matsui |
| 2016/0225327 | A1 | 8/2016 | Jang et al. |
| 2016/0284323 | A1 | 9/2016 | Neugebauer |
| 2016/0329019 | A1 | 11/2016 | An |
| 2016/0351102 | A1 | 12/2016 | Shin et al. |
| 2017/0162094 | A1* | 6/2017 | Jee ....................... G09G 3/006 |
| 2017/0168734 | A1 | 6/2017 | Zhang |
| 2017/0208661 | A1 | 7/2017 | Hussain et al. |
| 2018/0061333 | A1 | 3/2018 | Chu et al. |
| 2018/0174538 | A1 | 6/2018 | Lee et al. |
| 2019/0005898 | A1 | 1/2019 | Albrecht et al. |
| 2019/0027084 | A1 | 1/2019 | Lee et al. |
| 2019/0053342 | A1 | 2/2019 | Shih et al. |
| 2019/0114971 | A1 | 4/2019 | Choi et al. |

OTHER PUBLICATIONS

"Invitation to Pay Additional Fees and Partial International Search issued in PCT Application No. PCT/US18/055111", dated Jan. 8, 2019, 15 Pages.

"Non Final Office Action Issued in U.S. Appl. No. 15/786,326", dated Feb. 7, 2019, 10 Pages.

"International Search Report and Written Opinion Issued in PCT Application No. PCT/US2018/055111", dated Feb. 25, 2019, 19 Pages.

"Final Office Action Issued in U.S. Appl. No. 15/786,326", dated Jun. 12, 2019, 16 Pages.

"International Search Report and Written Opinion Issued in PCT Application No. PCT/US2018/055110", dated Jan. 31, 2019, 8 Pages.

* cited by examiner

COLOR VARIANCE GAMMA CORRECTION

BACKGROUND

With increasing consumer expectations of digital display performance, including accurate and consistent color reproduction, significant variation in output color as a function of varying output display content is increasingly unacceptable to users. Further, as consumer devices increasingly incorporate multiple displays oriented in close proximity to one another, output color variations are more noticeable to users. While display devices are often calibrated upon commissioning to provide similar output colors in response to input signals, they are not calibrated based on varying display content over time.

SUMMARY

Implementations described and claimed herein provide a computing device comprising an organic light-emitting diode (OLED) display and a display driver. The display driver detects an on-pixel ratio (OPR) of an input display signal, selects a gamma correction factor based on the detected OPR, applies the selected gamma correction factor to the input display signal, and outputs a color-corrected display signal to the OLED display.

Implementations described and claimed herein further provide a method of correcting output color on an OLED display. The method comprises receiving an input display signal, detecting an OPR of the input display signal, selecting a gamma correction factor corresponding to the detected OPR, applying the selected gamma correction factor to the input display signal, and outputting a color-corrected display signal to the OLED display.

Implementations described and claimed herein still further provide a computer-readable medium containing processor-executable instructions. The processor-executable instructions, when executed by a processor, cause the processor to receive an input display signal, detect an OPR of the input display signal, select a gamma correction factor corresponding to the detected OPR, apply the selected gamma correction factor to the input display signal, and output a color-corrected display signal to the OLED display.

Other implementations are also described and recited herein. This Summary is provided to introduce a selection of concepts in a simplified form that are further described below in the Detailed Descriptions. This Summary is not intended to identify key features or essential features of the claimed subject matter, nor is it intended to be used to limit the scope of the claimed subject matter.

BRIEF DESCRIPTIONS OF THE DRAWINGS

DETAILED DESCRIPTIONS

In an organic light-emitting diode (OLED) display, an emissive electroluminescent layer selectively emits light in discrete areas in response to electric current. Higher overall applied electrical currents correspond to higher overall output luminesces, however, as current is increased, attendant voltage applied to the electroluminescent layer generally drops (IR drop). Such variations in attendant voltage causes variations in output color. In sum, output color is affected by overall display luminance of the OLED display. The presently disclosed systems and methods correct for such variations in output color.

Figure 1:
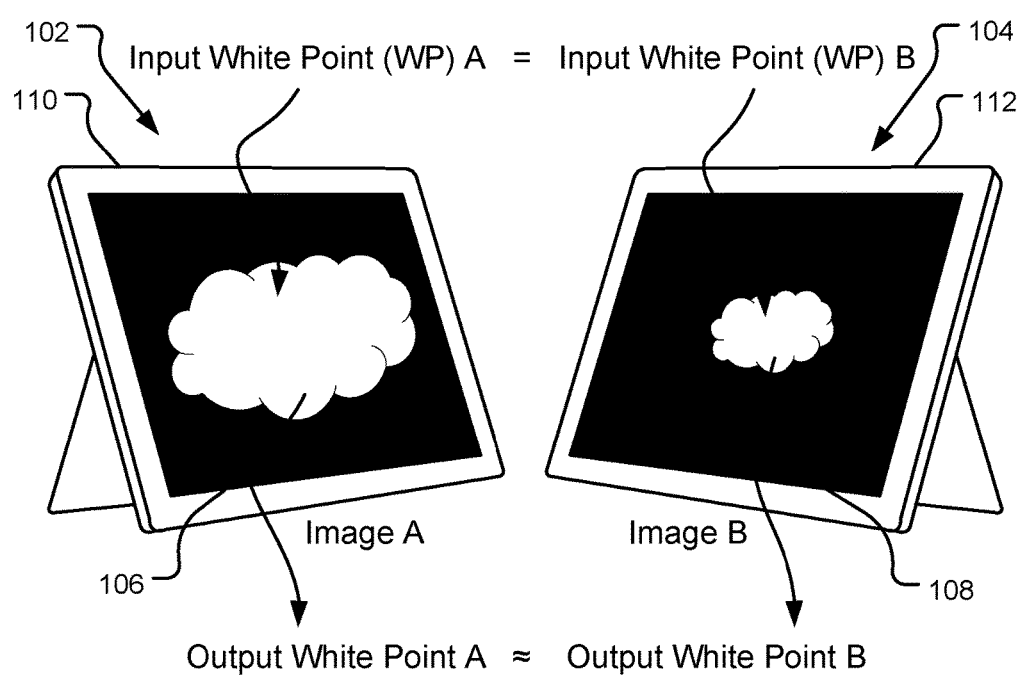
FIG. 1 illustrates two tablet computers, each with a different on-pixel ratio (OPR) and approximately equal output white point (WP).

FIG. 1 illustrates two tablet computers 102, 104, each with a different on-pixel ratio (OPR) and approximately equal output white point (WP). The tablet computers 102, 104 include OLED displays 106, 108, respectively, that span front-facing surfaces and chassis 110, 112, respectively, that occupy rear-facing surfaces of the tablet computers 102, 104. The chassis 110, 112 and OLED displays 106, 108, respectively, in combination serve as protective covers and mounting structures for internal electronic components (e.g., structural framework, printed circuit boards, microprocessors, integrated circuits, electronic storage devices, cooling components, cameras, antennas, speakers, microphones, and batteries) of the tablet computers 102, 104. The displays 106, 108 and/or the chassis 110, 112, may also occupy side-facing surfaces of the tablet computers 102, 104, respectively, and in combination encompass the internal electronic components of the tablet computers 102, 104.

By way of example, OLED display 106 outputs Image A, which is a relatively large white cloud against a dark (or black) background. OLED display 108 outputs Image B, which is a relatively small white cloud, also against a dark (or black) background. An input display signal to each of the OLED displays 106, 108 define the color of the large white cloud and the small white cloud, as well as the dark (or black) backgrounds and any other visual features output from the OLED displays 106, 108.

WP is defined herein as a specific color coordinate defining the color of "white." While a desired WP may vary and be defined using a variety of color spaces, WP serves as a reference for variations in color within the same OLED display in different OPR states and across multiple OLED displays with different OPRs. In various implementations, the depicted features (e.g., the clouds) of each of the Images A and B or equal to or indexed against the predefined WP. Gray color is defined herein as a specific color coordinate defining the color of "gray." While a desired gray color may vary and be defined using a variety of color spaces, gray color may also serve as a reference for variations in color within the same OLED display in different OPR states and across multiple OLED displays with different OPRs. In various implementations, the depicted features (e.g., the clouds) of each of the Images A and B or equal to or indexed against the predefined gray color. In various implementations, one or both of WP and gray color may be used as a reference for color correction of Images A and B.

OPR is defined herein as a percentage or portion of individual pixels with the OLED displays 106, 108 that are illuminated (consuming current) vs. de-illuminated (not consuming current). OPR may be calculated as a simple proportion of "on pixels" to "off pixels," or by computing a luminance value for each of the "on pixels" and using the luminance values to create a more nuanced proportion of "on pixels" to "off pixels." While OPR may be defined using a variety of techniques, OPR serves a reference for a relative overall state of luminance within each of the OLED displays 106, 108 and may be expressed as a value between 0% (e.g., no illuminated pixels) and 100% (e.g., all pixels illuminated). In some implementations, white portion (i.e., a portion of the displays 106, 108 that is outputting the color white) may be used in lieu of or in addition to OPR to define the relative overall state of luminance within the OLED displays 106, 108.

The overall electrical current applied to each of the OLED displays 106, 108 varies depending on OPR. More specifically, for each pixel in a low OPR state, the pixel receives a comparatively higher electric current than in a high OPR state due to low IR drop. As a result, the overall output color of the OLED displays 106, 108 varies depending on the OPR states of their respective pixels.

Again, by way of example, input WP A for the large white cloud shown on the OLED display 106 is the same as (or equal to) input WP B for the small white cloud shown on the OLED display 108. In conventional OLED displays, a substantial variation in OPR between two otherwise identical OLED displays (here, illustrated by a differently sized white cloud) substantially affects output display color of the large white cloud as compared to the small white cloud, as well as other features that may be illustrated on the OLED displays 106, 108. The difference may be sufficiently significant for a user to be aware of the variation, especially when the two otherwise identical OLED displays are placed adjacent to one another, as shown.

The presently disclosed technology compensates for the aforementioned variations in WP or gray color as a function of OPR. More specifically, two or more gamma correction factors (e.g., correction equations and/or look-up tables (LUTs)) are applied to the displays 106, 108 dependent upon a detected OPR in real-time. As a result, the variations in WP or gray color as a function of OPR are corrected as the OPR within each of the displays 106, 108 changes over time. The net result is that output WP or gray color A for the large white cloud shown on the OLED display 106 is approximately the same as (or equal to) output WP or gray color B for the small white cloud shown on the OLED display 108. In various implementations, approximately the same (or equal) output WP or gray color is +/−0.005 dxy (delta-xy of CIA 1931 color space).

While the OLED displays 106, 108 are each shown displaying a white cloud against a dark (or black) background, the OLED displays 106, 108 may display any image or combination of images, which may be used to calculate a current OPR of each of the OLED displays 106, 108. Further, while the two or more gamma correction factors are specifically described above as addressing variation in WP of the displays 106, 108, other output colors also vary as a function of OPR. As a result, the gamma correction factors may also address any or all colors defined within any color space.

Further, while the presently disclosed technology is specifically described with reference to OLED displays for tablet computers, it may apply to any display technology where luminescence is defined by current applied to the display and where output color varies with the attendant voltage (e.g., passive-matrix OLED (PMOLED), active-matrix OLED (AMOLED), or other display technologies). Still further, the OLED (or other type) displays described in detail herein may be incorporated into a variety of other computing devices that include or connect to a display (e.g., laptop computers, personal computers, gaming devices, smart phones, smart TVs, or other devices that carry out one or more specific sets of arithmetic and/or logical operations).

Figure 2:
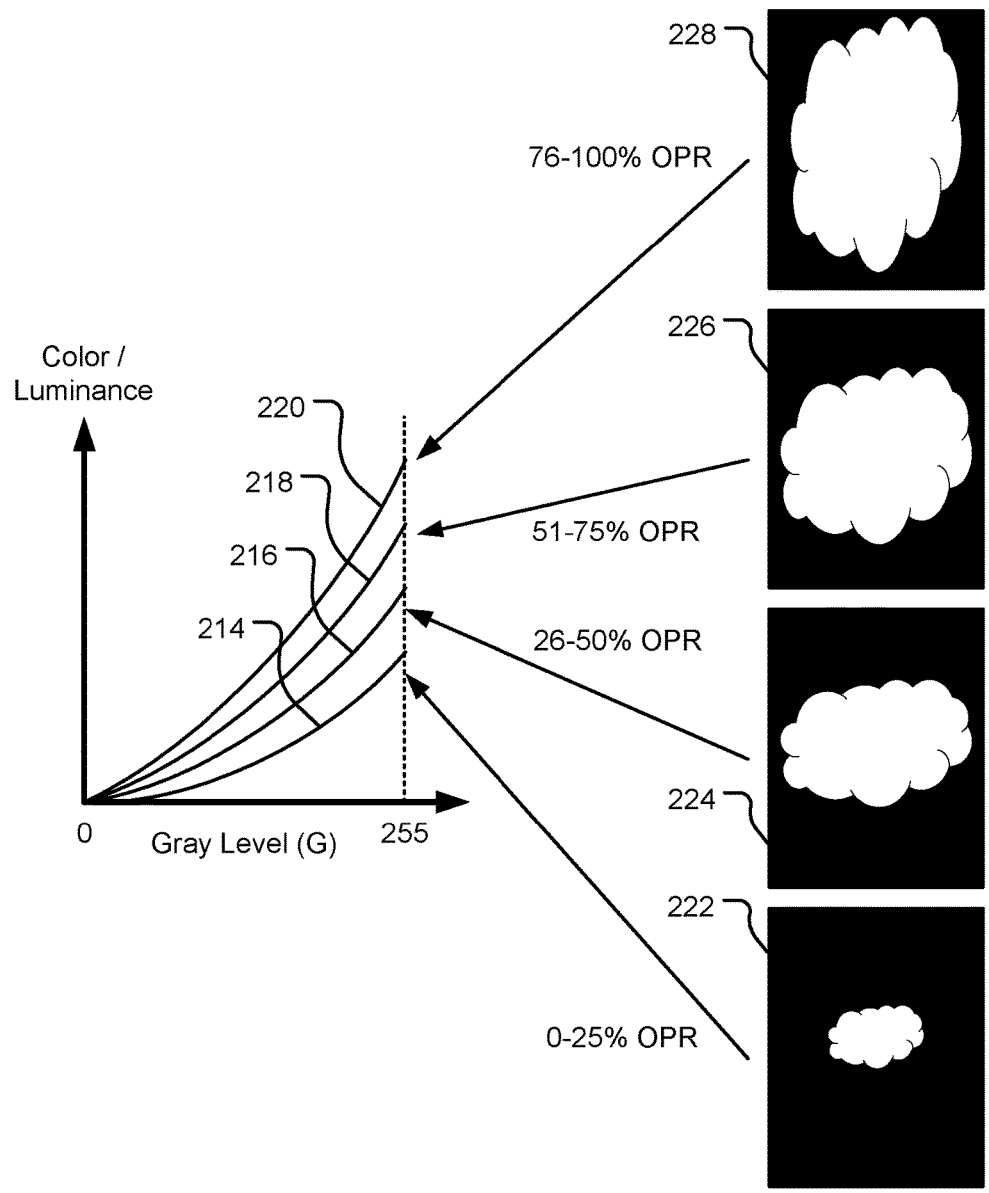
FIG. 2 illustrates a series of color curves, each corresponding to a predetermined OPR range and/or display brightness value (DBV) range.

FIG. 2 illustrates a series of color curves 214, 216, 218, 220, each corresponding to a predetermined OPR range and/or display brightness value (DBV) range. The color curves 214, 216, 218, 220 are each plotted as color and/or luminance values as a function of gray level and create a gamma correction factor based on the OPR and/or DBV of an associated OLED display (not shown). The gray level (x-axis) is illustrated from 0G (black) to 255G (white), while the color/luminance (y-axis) may have a variety of numerical ranges.

Specifically, a display input signal contains image 222, which illustrates a relatively small white cloud against a dark (or black) background. The image 222 has an OPR value within a 0%-25% range. As a result, the color curve 214 (or a corresponding gamma correction factor) is selected for rendering the image 222 on an OLED display. For a different OLED display (or the same OLED display at a different time), the display input signal contains image 224, which illustrates a larger white cloud also against a dark (or black) background. The image 224 has an OPR value within a 26%-50% range. As a result, the color curve 216 (or a corresponding gamma correction factor) is selected for rendering the image 224 on the OLED display.

For another different OLED display (or the same OLED display at another different time), the display input signal contains image 226, which illustrates a still larger white cloud also against a dark (or black) background. The image 226 has an OPR value within a 51%-75% range. As a result, the color curve 218 (or a corresponding gamma correction factor) is selected for rendering the image 226 on the OLED display. For yet another different OLED display (or the same OLED display at yet another different time), the display input signal contains image 228, which illustrates a relatively large white cloud also against a dark (or black) background. The image 228 has an OPR value within a 76%-100% range. As a result, color curve 220 (or a corresponding gamma correction factor) is selected for rendering the image 228 on the OLED display.

While the images 222, 224, 226, 228 each display a white cloud against a dark (or black) background, other images with other or additional colors may be used to calculate a current OPR and select one of the color curves 214, 216, 218, 220 based on the current OPR. Further, while color curves 214, 216, 218, 220 are shown for illustration purposes, equations defining the color curves 214, 216, 218, 220 and/or LUTs defining an array of points on each of the color curves 214, 216, 218, 220 (referred to herein as a gamma correction factor) are stored within a memory or a data storage (see e.g., memory device(s) 550 and storage device(s) 560 of FIG. 5) for access by a computing system (e.g., computing system 500 of FIG. 5). Still further, while four distinct images 222, 224, 226, 228 and corresponding color curves 214, 216, 218, 220 are shown and described above, any number of color curves greater than two may be used to categorize and color-correct images based on current OPR prior to output to an OLED display.

In other implementations, the color curves 214, 216, 218, 220 correspond to predetermined display brightness value (DBV) ranges and the images 222, 224, 226, 228 are rendered using a DBV value that falls within one of the ranges assigned to the color curves 214, 216, 218, 220.

Figure 3:
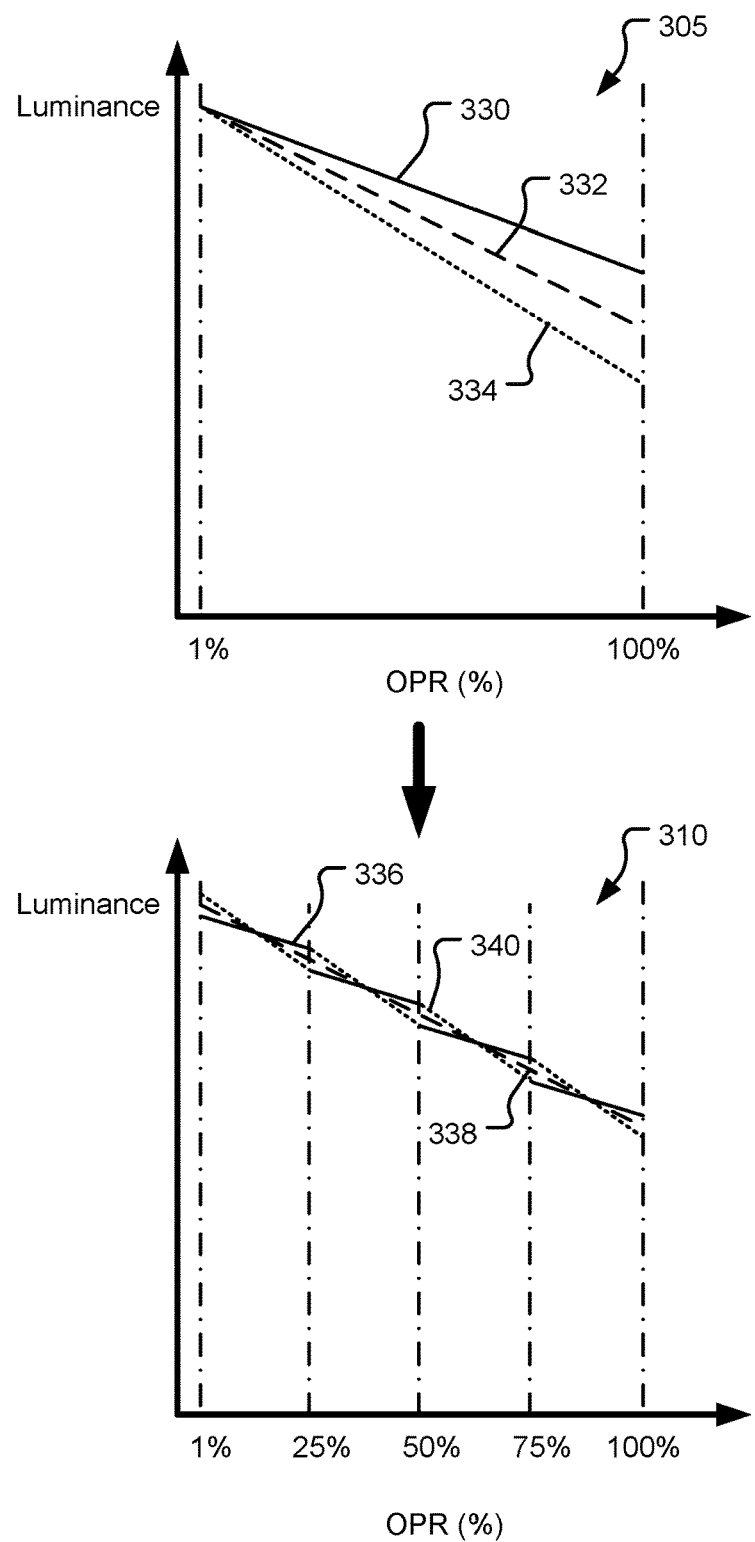
FIG. 3 illustrates luminance variation as a function of color and OPR when applying four distinct gamma correction factors.

FIG. 3 illustrates luminance variation as a function of color and OPR when applying four distinct gamma correction factors. Chart 305 illustrates luminance variation without color variance gamma correction, while chart 310 illustrates luminance variation with color variance gamma correction. The color space assumed for each of the charts 305, 310 is red-green-blue (RGB), or some variation thereof. However, the described effects of luminance variation as a function of color and OPR exist and may be similarly illustrated in any color space.

The chart 305 includes a solid black line 330 representing the color red, a dashed line 332 representing the color green, and a dotted line 334 representing the color blue. As shown, overall luminance of each of the lines 330, 332, 334 decreases as overall OPR increases. However, the downward slope of each of the lines 330, 332, 334 and their associated color luminance drop varies. As a result, the color-variation is most significant under high OPR conditions (e.g., at or near 100% OPR). The net result, is that overall color of an image varies as a function of OPR because the relative luminance of each of the component colors vary as a function of OPR. The chart 305 is calibrated such that at 1% OPR, the lines 330, 332, 334 converge and the relative luminance of each of the colors represented by the lines 330, 332, 334 is approximately the same. The chart 305 may be recalibrated such that the lines 330, 332, 334 converge at any specific preselected OPR, however, when operating an OLED display significantly away from the specific preselected OPR (above or below), the lines 330, 332, 334 diverge and the luminance differences between output colors may be noticeable by a user.

The chart 310 results when a series of gamma correction factors (here, 4 distinct gamma correction factors) are applied to the chart 305. The chart 310 also includes a solid black line 336 representing the color red, a dashed line 338 representing the color green, and a dotted line 340 representing the color blue. As compared to chart 305, each of the lines 330, 332, 334 diverge away from four preselected OPRs at approximately 12.5%, 37.5%, 62.5%, and 87.5% (as compared to one at 1% OPR in chart 305), as shown. This creates four distinct OPR ranges (e.g., 1% (or 0%)-25%, 26%-50%, 51%-75%, and 76%-100%), with each of the four preselected OPRs in the middle of one of the OPR ranges. Each of the four OPR ranges may also correspond to one of images 222, 224, 226, 228 of FIG. 2, for example.

While four (4) distinct gamma correction factors are illustrated and described above, any number of gamma correction factors may be used to avoid an unacceptable variance in luminance across a span of projected OPR values for an OLED display or series of OLED displays.

Figure 4:
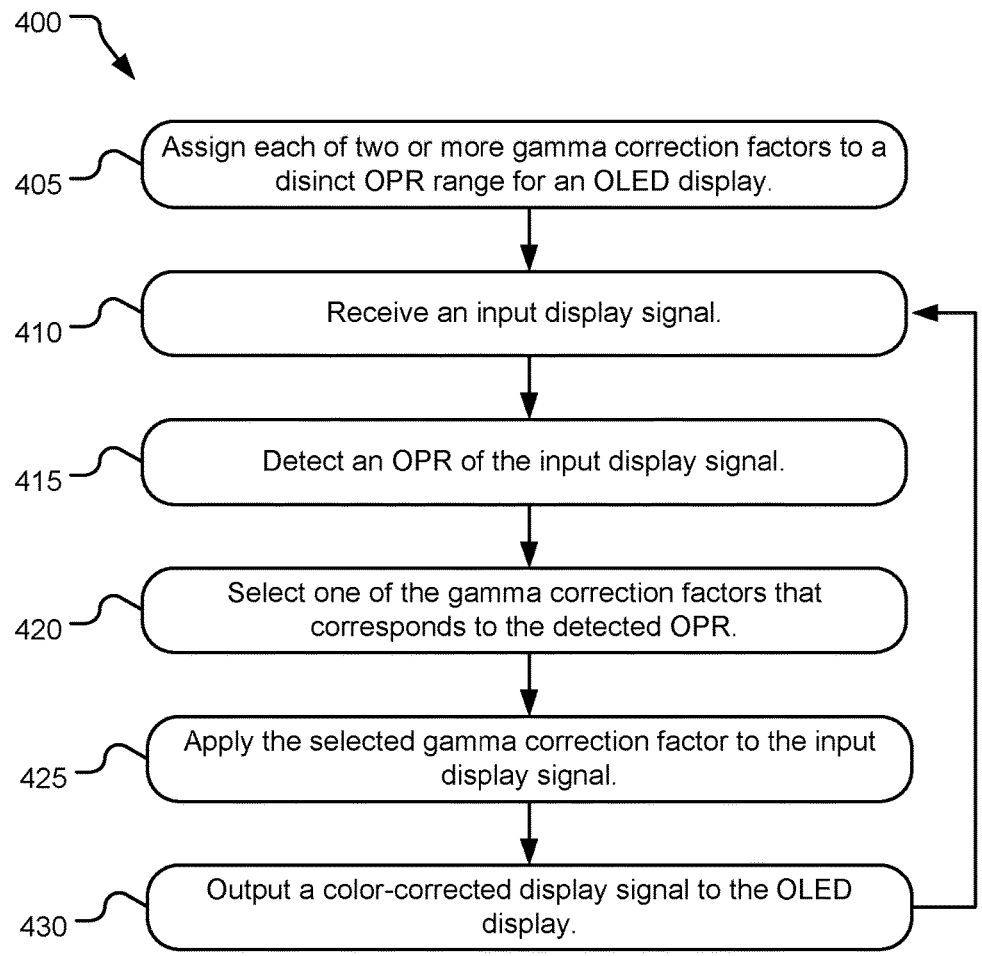
FIG. 4 illustrates example operations for correcting color variance in an OLED display.

FIG. 4 illustrates example operations 400 for correcting color variance in an OLED display. The operations 400 may be referred to herein as a "content-aware" color correction process. An assigning operation 405 assigns each of two or more gamma correction factors to a distinct OPR range for an OLED display. In various implementations, an operable range of OPR is defined for the OLED display (e.g., 0-100%, or a narrower range). The operable range of OPR is divided into two or more functional ranges, each of which is assigned a gamma correction factor. For example, a 2-factor system may include a 0-50% range and a 51-100% range. Similarly, a 4-factor system may include a 0-25% range, 26-50% range, 51-75% range, and a 76-100% range. Systems with more gamma correction factors may include increasingly small ranges for each factor. In various implementations, the OPR ranges may be equal (as described above) or unequal, depending on projected operating conditions of the OLED display.

The assigning operation 405 may be performed on each of a series of the OLED displays upon commissioning so that the individual displays have similar color variance gamma correction and output images that appear similar or identical to a user when the OLED displays placed adjacent one another. Further, the assigning operation 405 may be performed in addition to "content-unaware" color calibration processes, which calibrates each of a series of the OLED displays upon commissioning so that the individual displays have similar color outputs regardless of OPR. The "content-unaware" color calibration processes generally corrects for variances between individual OLED displays within the series, while the presently disclosed "content-aware" color correction process ensures that the color calibrated OLED displays remain color-consistent across a wide range of OPRs.

A receiving operation 410 receives an input display signal. The input display signal may be output from a central processing unit (CPU) to a graphics processing unit (GPU) and/or display driver that performs the remainder of the operations 400. In various implementations, the input display signal includes a stream of frames intended for an OLED display, that are collected within a frame buffer associated with the GPU and/or display driver. The frame buffer functions as a data store or content calculator for the following detecting operation 415.

The detecting operation 415 detects an OPR of the input display signal. More specifically, a gamma correction selector scans the frame buffer, selecting all or a subset of pixels (e.g., a regularly spaced array of pixels distributed across the entire frame or an array of pixels distributed within a specific area of the frame to be color-corrected) within all or a subset of the frames stored within the buffer (e.g., every frame, every third frame, every $10^{th}$ frame, and so one). In some implementations, a frame histogram may be used to select specific frames for detecting OPR of the input display signal (e.g., selecting only frames that are a substantial change from a previous or subsequent frame). An OPR calculation is performed on each of the selected frames and an OPR value is assigned to each of the selected frames.

A selecting operation 420 selects one of the gamma correction factors that corresponds to the detected OPR. As each of the gamma correction factors apply to a range of OPR, the detected OPR is compared against the predetermined ranges to select the most appropriate gamma correction factor. The gamma correction factors may be stored within memory or data storage as formulae that are applied in real-time to the detected OPR or a series of LUTs that contain gamma correction values. In various implementations, the selecting operation 420 may be performed by the gamma correction selector within the GPU and/or display driver.

An applying operation 425 applies the selected gamma correction factor to the input display signal. The applying operation 425 may be performed as a signal-processing operation that modifies the input display signal using the selected gamma correction factor. The applying operation 425 may further modify the input display signal for entire frames to be output to the OLED display, or specific areas of the frames that are to be color-corrected (e.g., areas of the OLED display that are more susceptible to color-variation or where variations are more likely to be noticed by a user). For example, applying the selected gamma correction factor to only specific areas of the frames may be used to address color-uniformity issues across the OLED display. In various implementations, the applying operation 425 may be performed by a gamma corrector within the GPU and/or display driver. In various implementations, the GPU and/or display driver may perform the applying operation 425 in real-time to modify the input display signal. Additional "content aware" and/or "content unaware" signal-processing may also be performed by the GPU and/or display driver on the input display signal prior to outputting operation 430.

The outputting operation 430 outputs the color-corrected display signal to the OLED display. As a result, multiple displays with widely varying OPR may present a user substantially similar color representations. In some example implementations, the color may vary by no more than 0.005 dxy over the entire operable range of OPR for each OLED display fed a color-corrected display signal.

Figure 5:
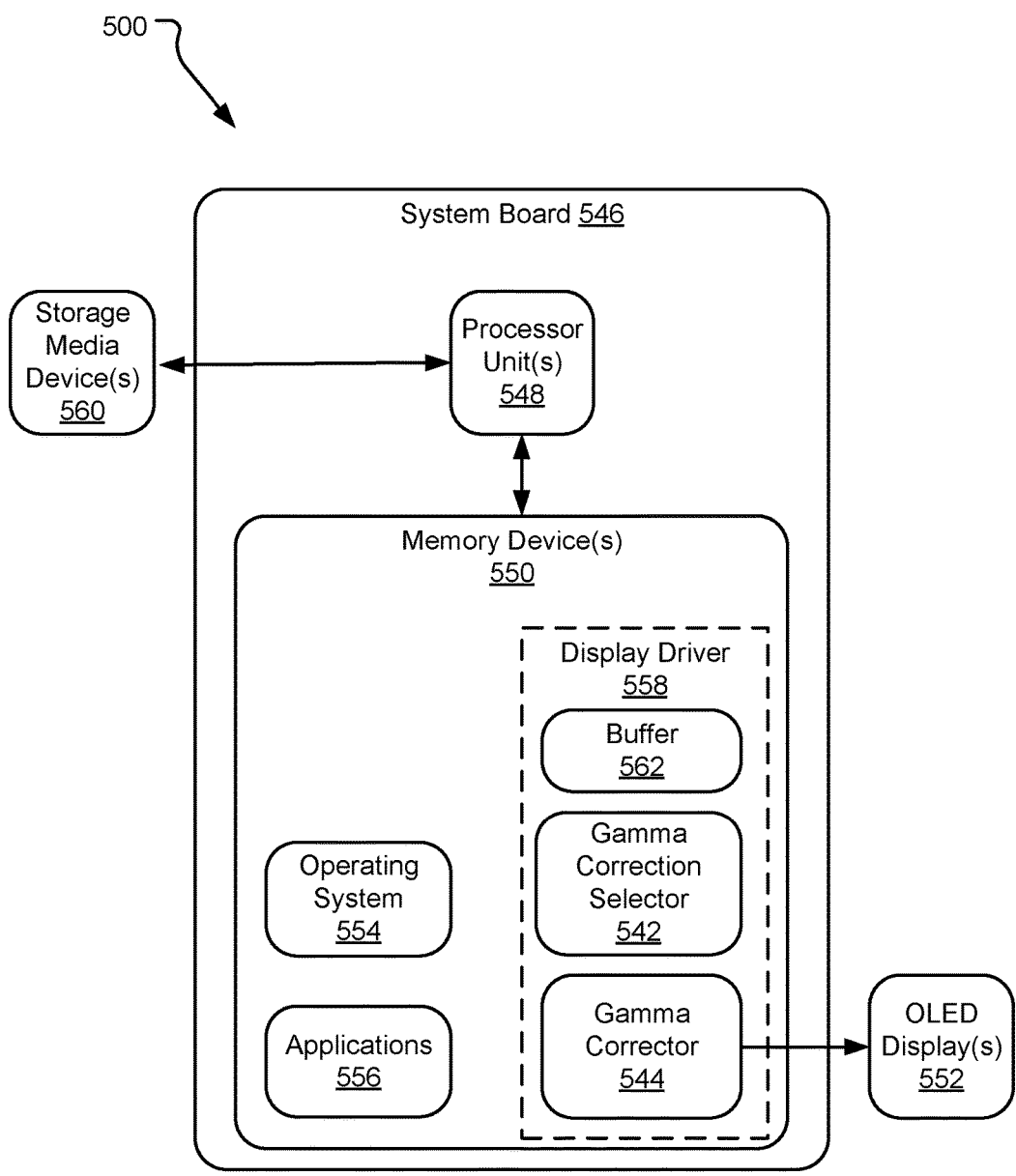
FIG. 5 illustrates a computing system incorporating a gamma correction selector and a gamma corrector for an OLED display.

FIG. 5 illustrates a computing system 500 incorporating a gamma correction selector 542 and a gamma corrector 544 for an OLED display(s) 552. The computing system 500 may include a system board 546, upon which a variety of microelectronic components for the computing system 500 are attached and interconnected. For example, the system board 546 may include one or more processor units 548 (e.g., discrete or integrated microelectronic chips and/or separate but integrated processor cores, including but not limited to central processing units (CPUs) and graphic processing units (GPUs)), at least one memory device 550 (which may be integrated into systems or chips of the computing system 500), a storage media device(s) 560 (e.g., a flash or hard disk drive), one or more OLED display(s) 552, and other input/output devices (not shown).

The memory device(s) 550 and the storage media device(s) 560 may include one or both of volatile memory (e.g., random-access memory (RAM)) and non-volatile memory (e.g., flash memory or magnetic storage). An operating system 554, such as one of the varieties of the Microsoft Windows® operating system, resides in the memory device(s) 550 and/or the storage media device(s) 560 and is executed by at least one of the processor units 548, although other operating systems may be employed. One or more additional applications 556 are loaded in the memory device(s) 550 and/or the storage media device(s) 560 and executed within the operating system 554 by at least one of the processor units 548.

The memory device(s) 550 and/or the storage media device(s) 560 may further include one or more drivers, including display driver 558 (e.g., a display driver integrated circuit (DDIC)). The display driver 558 receives input display signal from the processor unit(s) 548, stores the input display signals within a buffer 562, conditions the input display signals, and outputs a conditioned display signal to the OLED display(s) 552. In various implementations, the input display signal includes a sequence of frames for visual representation on the OLED display(s) 552. The gamma correction selector 542 selects one of a series of gamma correction factors stored within the memory device(s) 550 and/or the storage media device(s) 560 that corresponds to a detected OPR of a frame or set of frames stored within the buffer 562. As each of the gamma correction factors apply to a range of OPR, the detected OPR is compared against the predetermined ranges to select the most appropriate gamma correction factor. The gamma correction factors may be stored within the memory device(s) 550 and/or the storage media device(s) 560 as formulae that are applied in real-time to the detected OPR or a series of LUTs that contain gamma correction values.

The gamma corrector 544 applies the selected gamma correction factor to the input display signal as a signal-processing operation that modifies the input display signal. The display driver 558 may also perform additional signal-processing on the input display signal prior to output. The display driver 558 then outputs the color-corrected display signal to the OLED display(s) 552.

The computing system 500 may include a variety of tangible computer-readable storage media (e.g., the memory device(s) 550 and the storage media device(s) 560) and intangible computer-readable communication signals. Tangible computer-readable storage can be embodied by any available media that can be accessed by the computing system 500 and includes both volatile and non-volatile storage media, as well as removable and non-removable storage media implemented in any method or technology for storage of information such as computer readable instructions, data structures, program modules or other data. Tangible computer-readable storage media includes, but is not limited to, RAM, read-only memory (ROM), electrically erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other tangible medium which can be used to store the desired information and which can be accessed by the computing system 500. Tangible computer-readable storage media excludes intangible communications signals.

Intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, radio-frequency (RF), infrared (IR), and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (APIs), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

Some embodiments of the invention described herein are implemented as logical steps in one or more computer systems. The logical operations are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations described herein are referred to variously as operations, steps, objects, or modules. Furthermore, the logical operations may be performed in any order, adding or omitting operations as desired, unless explicitly claimed otherwise or a specific order is inherently necessitated by the claim language.

An example computing device according to the presently disclosed technology comprises an organic light-emitting diode (OLED) display and a display driver. The display driver detects an on-pixel ratio (OPR) of an input display signal, selects a gamma correction factor based on the detected OPR, applies the selected gamma correction factor to the input display signal, and outputs a color-corrected display signal to the OLED display.

In another example computing device according to the presently disclosed technology, the display driver includes a gamma correction selector that selects the gamma correction factor based on the detected OPR and a gamma corrector that applies the selected gamma correction factor to the input display signal.

In another example computing device according to the presently disclosed technology, the gamma correction factor adjusts one or both of white point and gray color of the color-corrected display signal.

In another example computing device according to the presently disclosed technology, the gamma correction factor is applied to a portion of the input display signal corresponding to a discrete area of the OLED display.

Another example computing device according to the presently disclosed technology further comprises a display frame buffer to store the input display signal.

Another example computing device according to the presently disclosed technology further comprises a storage device to store the gamma correction factor.

In another example computing device according to the presently disclosed technology, the gamma correction factor is selected from one or more look-up tables (LUTs) within the storage device.

In another example computing device according to the presently disclosed technology, the gamma correction factor is calculated in real time using one or more gamma correction formulae stored within the storage device.

In another example computing device according to the presently disclosed technology, the storage device includes one or both of volatile memory and a non-volatile storage media.

An example method of correcting output color on an OLED display according to the presently disclosed technology comprises receiving an input display signal, detecting an OPR of the input display signal, selecting a gamma correction factor corresponding to the detected OPR, applying the selected gamma correction factor to the input display signal, and outputting a color-corrected display signal to the OLED display.

Another example method of correcting output color on an OLED display according to the presently disclosed technology further comprises assigning each of two or more gamma correction factors to a distinct OPR range for the OLED display. The gamma correction factor is selected from the assigned two or more gamma correction factors.

In another example method of correcting output color on an OLED display according to the presently disclosed technology, the gamma correction factor adjusts one or both of white point and gray color of the color-corrected display signal.

In another example method of correcting output color on an OLED display according to the presently disclosed technology, the gamma correction factor is applied to a portion of the input display signal corresponding to a discrete area of the OLED display.

In another example method of correcting output color on an OLED display according to the presently disclosed technology, the gamma correction factor is selected from one or more look-up tables (LUTs) within a storage device.

In another example method of correcting output color on an OLED display according to the presently disclosed technology, the gamma correction factor is calculated in real time using one or more gamma correction formulae stored within a storage device.

An example computer-readable medium according to the presently disclosed technology containing processor-executable instructions that, when executed by a processor, cause the processor to receive an input display signal, detect an OPR of the input display signal, select a gamma correction factor corresponding to the detected OPR, apply the selected gamma correction factor to the input display signal, and output a color-corrected display signal to an OLED display.

In another example computer-readable medium according to the presently disclosed technology, the processor-executable instructions further cause the processor to assign each of two or more gamma correction factors to a distinct OPR range for the OLED display, wherein the gamma correction factor is selected from the assigned two or more gamma correction factors.

In another example computer-readable medium according to the presently disclosed technology, the gamma correction factor is applied to a portion of the input display signal corresponding to a discrete area of the OLED display.

In another example computer-readable medium according to the presently disclosed technology, the gamma correction factor is selected from one or more LUTs within a storage device.

In another example computer-readable medium according to the presently disclosed technology, the gamma correction factor is calculated in real time using one or more gamma correction formulae stored within a storage device.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:
1. A computing device comprising:
an organic light-emitting diode (OLED) display; and
a display driver to detect an on-pixel ratio (OPR) of an input display signal, select a gamma color correction factor based on the detected OPR to achieve a desired reference color, apply the selected gamma color correction factor to the input display signal, and output a color-corrected display signal to the OLED display.

2. The computing device of claim 1, wherein the display driver includes:
a gamma correction selector to select the gamma color correction factor based on the detected OPR; and
a gamma color corrector to apply the selected gamma color correction factor to the input display signal.

3. The computing device of claim 1, wherein the desired reference color is one or both of white point and gray color of the color-corrected display signal.

4. The computing device of claim 1, wherein the gamma color correction factor is applied to a portion of the input display signal corresponding to a discrete area of the OLED display.

5. The computing device of claim 1, further comprising:
a display frame buffer to store the input display signal.

6. The computing device of claim 1, further comprising:
a storage device to store the gamma color correction factor.

7. The computing device of claim 6, wherein the gamma color correction factor is selected from one or more look-up tables (LUTs) within the storage device.

8. The computing device of claim 6, wherein the gamma color correction factor is calculated in real time using one or more gamma color correction formulae stored within the storage device.

9. The computing device of claim 6, wherein the storage device includes one or both of volatile memory and a non-volatile storage media.

10. A method of correcting output color on an organic light-emitting diode (OLED) display comprising:
receiving an input display signal;
detecting an on-pixel ratio (OPR) of the input display signal;
selecting a gamma color correction factor corresponding to the detected OPR to achieve a desired reference color;
applying the selected gamma color correction factor to the input display signal; and
outputting a color-corrected display signal to the OLED display.

11. The method of claim 10, further comprising:
assigning each of two or more gamma color correction factors to a distinct OPR range for the OLED display, wherein the gamma color correction factor is selected from the assigned two or more gamma color correction factors.

12. The method of claim 10, wherein the desired reference color is one or both of white point and gray color of the color-corrected display signal.

13. The method of claim 10, wherein the gamma color correction factor is applied to a portion of the input display signal corresponding to a discrete area of the OLED display.

14. The method of claim 10, wherein the gamma color correction factor is selected from one or more look-up tables (LUTs) within a storage device.

15. The method of claim 10, wherein the gamma color correction factor is calculated in real time using one or more gamma color correction formulae stored within a storage device.

16. A tangible computer-readable medium containing processor-executable instructions that, when executed by a processor, cause the processor to:
receive an input display signal;
detect an on-pixel ratio (OPR) of the input display signal;
select a gamma color correction factor corresponding to the detected OPR to achieve a desired reference color;
apply the selected gamma color correction factor to the input display signal; and
output a color-corrected display signal to an organic light-emitting diode (OLED) display.

17. The tangible computer-readable medium of claim 16, wherein the processor-executable instructions further cause the processor to:
assign each of two or more gamma color correction factors to a distinct OPR range for the OLED display, wherein the gamma color correction factor is selected from the assigned two or more gamma color correction factors.

18. The tangible computer-readable medium of claim 16, wherein the gamma color correction factor is applied to a portion of the input display signal corresponding to a discrete area of the OLED display.

19. The tangible computer-readable medium of claim 16, wherein the gamma color correction factor is selected from one or more LUTs within a storage device.

20. The tangible computer-readable medium of claim 16, wherein the gamma color correction factor is calculated in real time using one or more gamma color correction formulae stored within a storage device.

* * * * *